Nov. 27, 1934.    G. E. ATKINSON    1,982,410
ELECTRICAL COOKING UTENSIL
Filed April 25, 1933    2 Sheets-Sheet 1
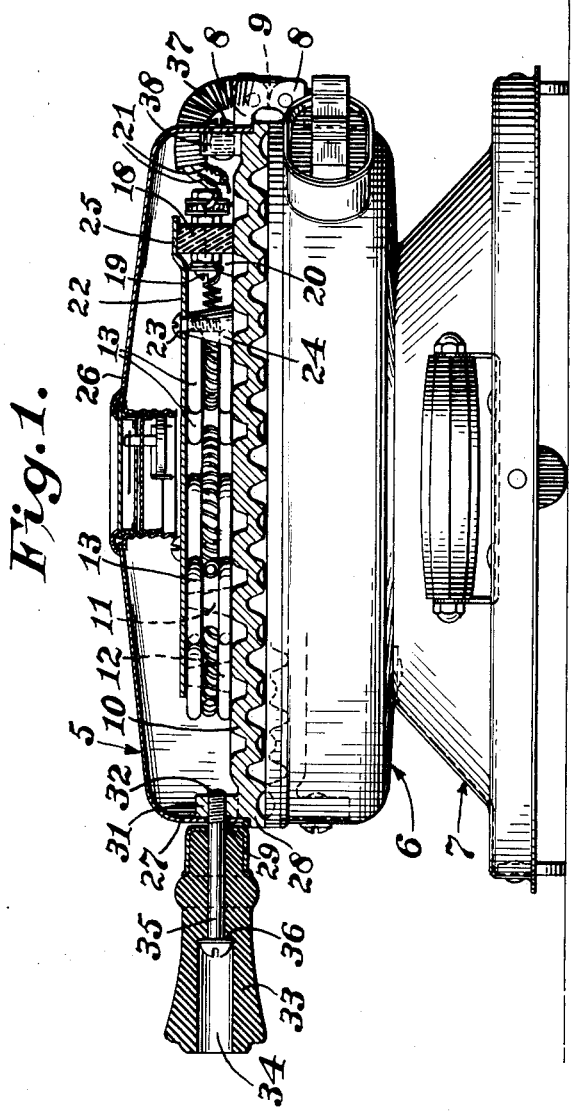
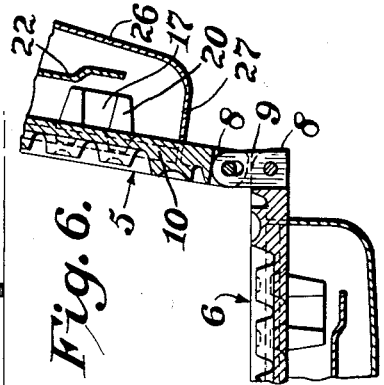
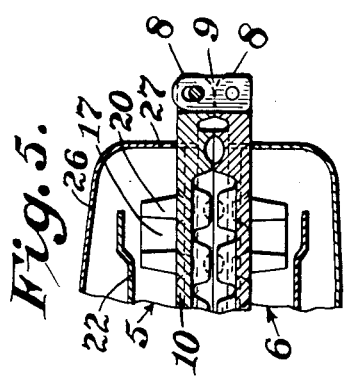
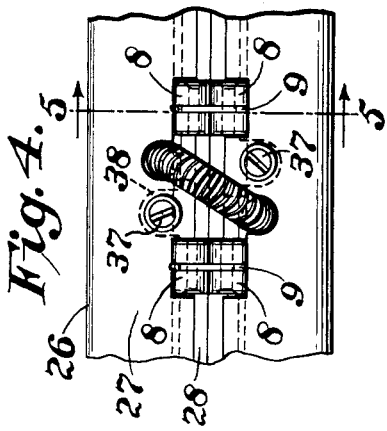
Inventor:
George E. Atkinson,
By Spear, Davidson & Hall
Attorneys.

Nov. 27, 1934.  G. E. ATKINSON  1,982,410
ELECTRICAL COOKING UTENSIL
Filed April 25, 1933  2 Sheets-Sheet 2

Inventor:
George E. Atkinson,
By Spear, Donaldson & Hall
Attorneys.

Patented Nov. 27, 1934

1,982,410

UNITED STATES PATENT OFFICE 1,982,410

ELECTRICAL COOKING UTENSIL

George Edwin Atkinson, Proctorville, Ohio, assignor to Armstrong Appliance Corporation, Huntington, W. Va., a corporation of Delaware Application April 25, 1933, Serial No. 667,921

5 Claims. (Cl. 219—19)

This invention relates to electrically heated utensils and more particularly to means for assembling the parts thereof in operative relationship.

An object of the invention is to provide supporting means for the radiant heating element whereby it will positively be positioned away from the metallic portions of the utensil and the utensil will receive unobstructed radiation from the heating element.

Another object of the invention is the provision of upstanding means formed integrally with the utensil for supporting the insulators which carry the radiant heating element, whereby the separate parts may be readily assembled.

Another object is the provision of a combined reflector and retaining plate for securing the insulators on the supporting means.

A further object of the invention is the provision of a common means for securing the handle and the casing to the utensil.

Other objects will hereinafter appear.

A preferred embodiment of the invention is illustrated in the accompanying drawings as applied to a waffle iron, and in which:

Figure 1 is an elevation of a waffle iron with part of the upper casing broken away.

Fig. 4 is a rear fragmentary elevation of the waffle iron.

Fig. 5 is a fragmentary side view in section with the grids closed.

Fig. 6 is a view of Fig. 5 with the grids opened.

Figure 2:
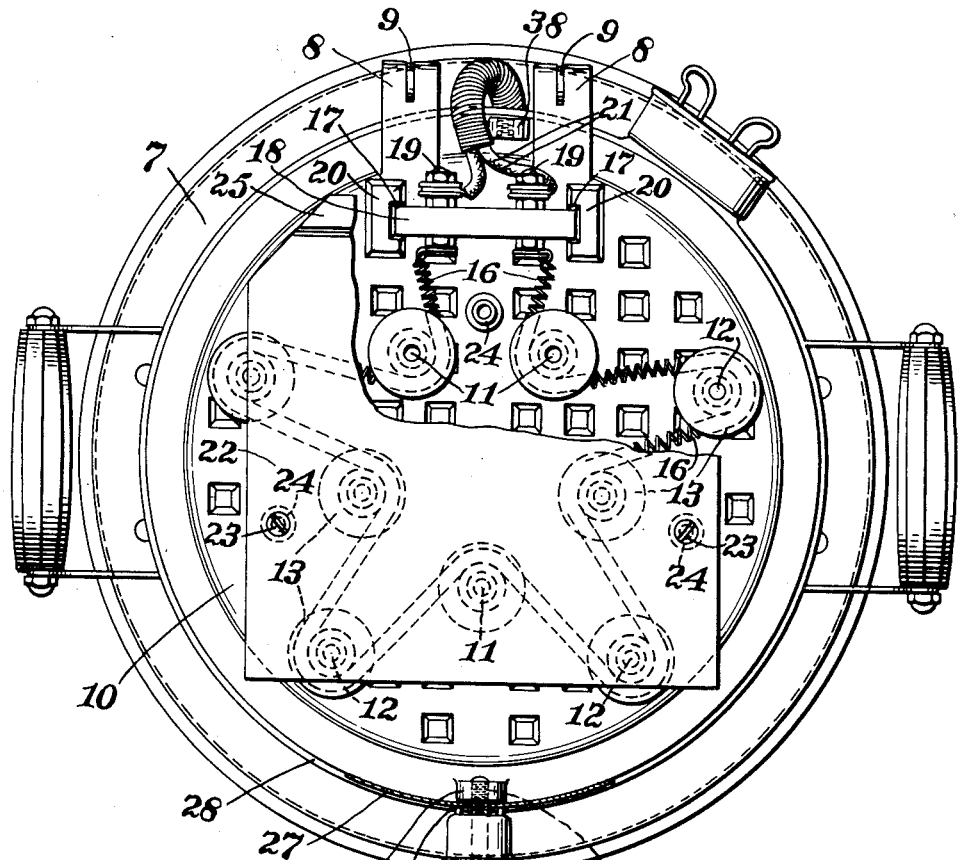
Fig. 2 is a plan view of the upper grid with the casing removed, and part of the retaining plate removed.
Figure 3:
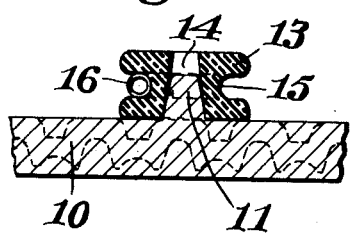
Fig. 3 is a detail view in section of one heating element support.
Figure 7:
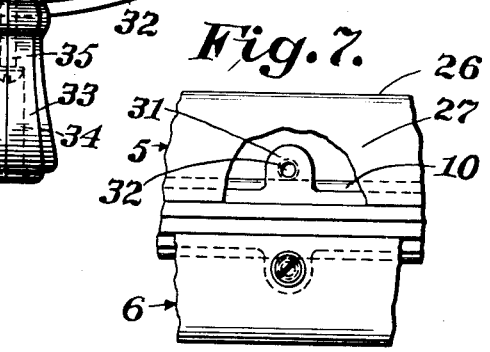
Fig. 7 is a front fragmentary elevation, part of the casing being broken away.

The waffle iron comprises the upper grid assembly 5 and the lower grid assembly 6 which is supported by the base 7. The upper and lower grids are pivotally connected together in any well known manner as by the hinge lugs 8 and links 9. Since the lower grid assembly 6 is a duplicate of the upper grid assembly 5, only the latter assembly will be described in detail, although the duplication in structure will be understood.

The upper grid 10 is provided with a plurality of upstanding insulator supports as here shown in the form of bosses or projecting pins 11 and 12. These are preferably formed integrally with the grid but it is apparent that they may be provided as separate elements to be secured to the grid. It is desirable that the pins be located both near the center of the grill and adjacent its periphery, and be so spaced that a line may be drawn successively from one pin to another without crossing over a previously drawn part of the line.

One possible arrangement of the pins as shown in the drawings, is the spacing of an inner row of pins 11 about a circle at the center of the grid 10. The pins 12 of the outer row are spaced about a circle which is substantially concentric with the circle of the inner row. Each inner pin 11 is also spaced approximately equidistant from the two adjacent outer pins 12.

Mounted upon each pin is an insulator 13 of short cylindrical shape. This insulator has an axial bore 14 which is adapted to receive the pins and securing the insulator against lateral movement. Formed in the cylindrical face of the insulator is a groove 15 in which is supported the radiant heating element 16. The element 16 may be the ordinary coiled resistance wire which becomes heated upon passage of an electric current and which is looped around each insulator.

This means for supporting the heating element 16 has several advantages. It effectively supports the wire above the metallic grid and prevents contact with any metallic part of the waffle iron such as might cause a short circuit. Since no interposed electrical insulating material is present between the grid and the heating element, the grid is exposed to direct and unobstructed radiation from nearly the entire length of the element 16. Because of the location of the pins as heretofore pointed out, the entire surface of the grid is generally heated to the same extent. It is further to be noted that because of this structure the separate parts may readily be assembled and that inspection and replacement are facilitated.

Preferably located near the hinged portion of the grid 10 are a pair of insulator supports in the form of upstanding bosses or lugs 20 having their opposing faces longitudinally grooved as at 17. Extending between the lugs 20 and having engagement within the grooves 17 is an insulator block 18. The block 18 is apertured to receive a pair of binding posts 19 to which the ends of the heating element 16 are separately connected and to which the lead wires 21 are fastened. It will be noted that the binding posts are positively separated from any portion of the metallic grid and that by the arrangement shown the ends of the wire 16 lead directly to the binding posts.

It will be observed that the lugs 20 are located in the position that would normally be occupied by one of the outer pins 12, and that accordingly the insulator 18 is equidistantly spaced with respect to the insulators 13 as has been pointed out. Since the ends of the heating element 16 are connected to the binding posts 19 carried by the insulator 18, the heating element forms a figure having nearly uniform projecting points. By this arrangement, equalized radiation to the entire grid is attained.

To prevent disengagement of the insulators 13 from the pins and the insulator 18 from the lugs 20, a retaining plate 22 overlies the insulators and holds them on the pins. This plate is held in place by a plurality of bolts 23 passing through the plate and engaging with upstanding portions of the grid. In accordance with this invention these upstanding portions are posts 24 terminating or having a shoulder at substantially the plane of the upper surface of the insulators 13. The posts are axially bored and threaded to receive the screws 23, thus enabling the plate to be tightly clamped against the posts. Since the posts 24 present a shoulder substantially in the plane of the upper surfaces of the insulators, the plate may be securely held in position without compressing and fracturing the insulators which may be made of frangible material.

To accommodate the nuts carried by the binding posts 19 and insure their adequate spacing from the metallic grid and plate 22, the insulator block 18 preferably extends above the plane of the upper surface of the insulators 13. A short circuit at the binding posts is thus effectively prevented. With this arrangement the plate 22 should be formed with an offset portion 25 to rest on the top of the insulator 18.

It is an important provision of this invention that the plate 22 serve the double function of retaining the insulators in place and act as a reflector plate. Heat radiated against this plate is reflected back toward the grid, thus increasing the efficiency of operation of the device while minimizing the temperature of the outer exposed surfaces of the waffle iron.

Enclosing the heating element is a casing 26 which overlies the grid and has a depending portion 27 seating against the grid, as against the annular flange 28. Adjacent the periphery of the grid and substantially diametrically opposite from the hinged portion is an upstanding lug 31 which has a threaded transverse bore 32. In registration with this bore when the casing is in position, is an aperture 29 formed in the casing.

The handle 33 may be axially bored as at 34 to receive a bolt 35 extending beyond it. As here shown, the head of the bolt seats against a shoulder 36 formed within the bore 34. The threaded end of the bolt 35 extends through the aperture 29 and into the threaded bore 32 with which it engages. When the bolt is tightened it is apparent that the handle, the casing, and the grid will all be held in fixed position. This means of securing the parts together by a single bolt is a feature of this invention. The casing may be secured to the grid at other points as by a bolt 37 engaging with a lug 38 similar to the arrangement pointed out.

Although the provisions of this invention have for purposes of illustration been shown and described as applied to a waffle iron, it is apparent that they may be applied to a wide range of electrically heated utensils. It will therefore be understood that the invention is not limited to the practical embodiment disclosed, but is to be determined by the scope of the appended claims.

I claim:

1. The combination in an electrical cooking utensil having a heating grid, of a plurality of upstanding insulator supports carried by said grid, a plurality of insulators each having engagement with a support, a radiant heating element carried by the insulators, a plurality of upstanding posts carried by the grid, said posts having a shoulder lying substantially in the plane of the upper surface of the insulators, a combined reflector and retaining plate overlying the insulators and contacting with the shoulders of the posts, and means for securing said plate against said shoulders to prevent disengagement of the insulators from the supports, said shoulders sustaining the stressing force exerted by the securing means so that the insulators are free of stress.

2. The combination in an electrical cooking utensil having a grid, of a pair of upstanding insulator supports carried by said grid, said supports having their opposing faces vertically grooved, an insulator extending between the supports and engaging within said grooves, binding posts carried by said insulator, a radiant heating element connected to said binding posts, a retaining plate above the insulator, and means for securing the plate in position to prevent movement of the insulator from said grooves.

3. The combination in an electrical cooking utensil having a grid, of a plurality of upstanding insulator supports arranged on said grid, two of said insulator supports being closely spaced and having their opposing faces vertically grooved, an insulator extending between the closely spaced supports and engaging within said grooves, said insulator being provided with binding posts, a plurality of insulators having axial engagement with the remaining insulator supports, a radiant heating element connected to the binding posts and supported above the grid by the insulators, at least one upstanding post carried by the grid, a combined reflector and retaining plate overlying the insulators, and engaging means between said plate and said post for urging the plate toward the insulators to prevent disengagement of the insulators from the supports.

4. The combination according to claim 3 in which the insulator carrying the binding posts extends above the plane of the upper surface of the remaining insulators, and is retained in place by an offset portion of said plate.

5. The combination in an electrical cooking utensil having a grid, of an inner circular row of upstanding insulator supports carried by the grid, an outer circular row of upstanding insulator supports carried by the grid and including a pair of relatively closely spaced supports, said closely spaced supports having their opposing faces vertically grooved, an insulator extending between the closely spaced supports and engaging with said grooves, said insulator being provided with binding posts, a plurality of insulators having axial engagement with the remaining insulator supports, a radiant heating element connected to the binding posts and extending between and being elevated above the grid by the insulators, a combined reflector and retaining plate overlying the insulators, and means for holding said retaining plate in position to prevent disengagement of the insulators from the supports.

GEORGE EDWIN ATKINSON.